Figure 1:
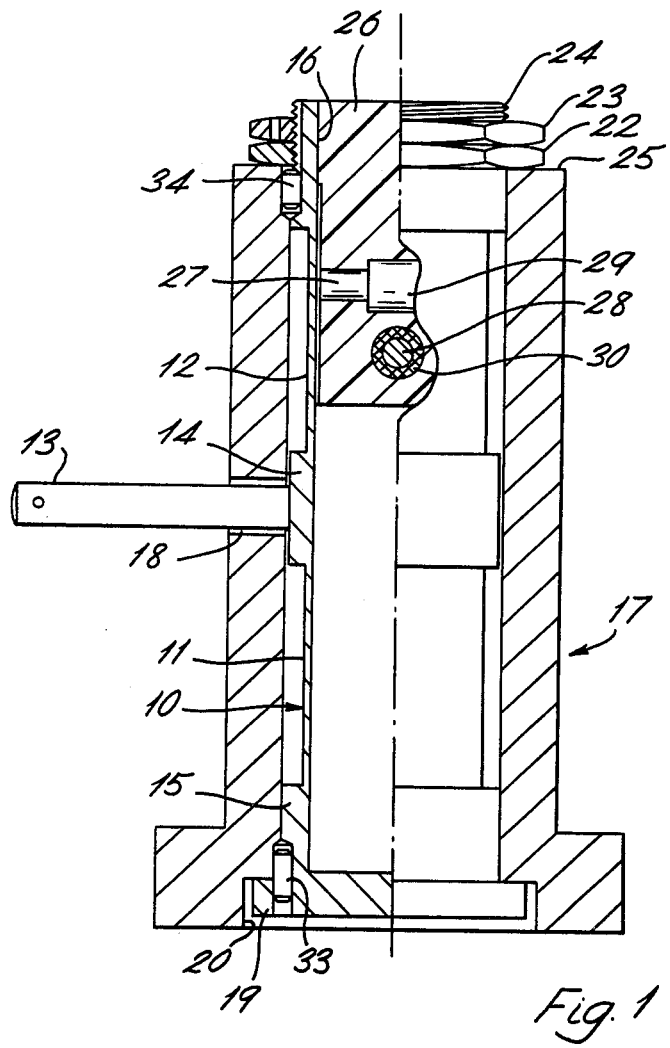

United States Patent [19] [11] 4,099,411
Woolvet et al. [45] Jul. 11, 1978

[54] STRAIN MEASUREMENT

[75] Inventors: George Albert Woolvet, Kingston-upon-Thames; Bryan Peter Tolley, Humberside, both of England

[73] Assignee: National Research Development Corp., London, England

[21] Appl. No.: 780,337

[22] Filed: Mar. 23, 1977

[30] Foreign Application Priority Data

Mar. 24, 1976 [GB] United Kingdom ............... 11851/76

[51] Int. Cl.² .............................................. G01L 1/10
[52] U.S. Cl. ............................. 73/141 R; 73/136 A; 73/DIG. 1
[58] Field of Search ............ 73/DIG. 1, 67.2, 136 A, 73/136 B, 517 AV, 141 R, 579, 581

[56] References Cited

U.S. PATENT DOCUMENTS

| 2,260,036 | 10/1941 | Kuehni | 73/136 A |
| 2,615,332 | 10/1952 | Quinn | 73/136 A |
| 3,021,711 | 2/1962 | Arvidson | 73/398 R |
| 3,435,377 | 3/1969 | Franklin | 73/DIG. 1 X |
| 3,813,934 | 6/1974 | Meyer | 73/DIG. 1 X |

Primary Examiner—Charles A. Ruehl

[57] ABSTRACT

Apparatus and methods for measuring strain and torque are described. The apparatus, which is used in the methods, usually includes a thin walled cylinder within a thick walled cylinder, the cylinders being fixed together at their ends only, means for vibrating the walls of the thin walled cylinder and means for indicating the frequency of vibration. As torque is applied to the thick walled cylinder and therefore to the thin walled cylinder, longitudinal strain appears in the thin walled cylinder and the frequency of vibration changes. Thus an indication is obtained of the applied torque or of strain in a test member applying the torque.

14 Claims, 3 Drawing Figures

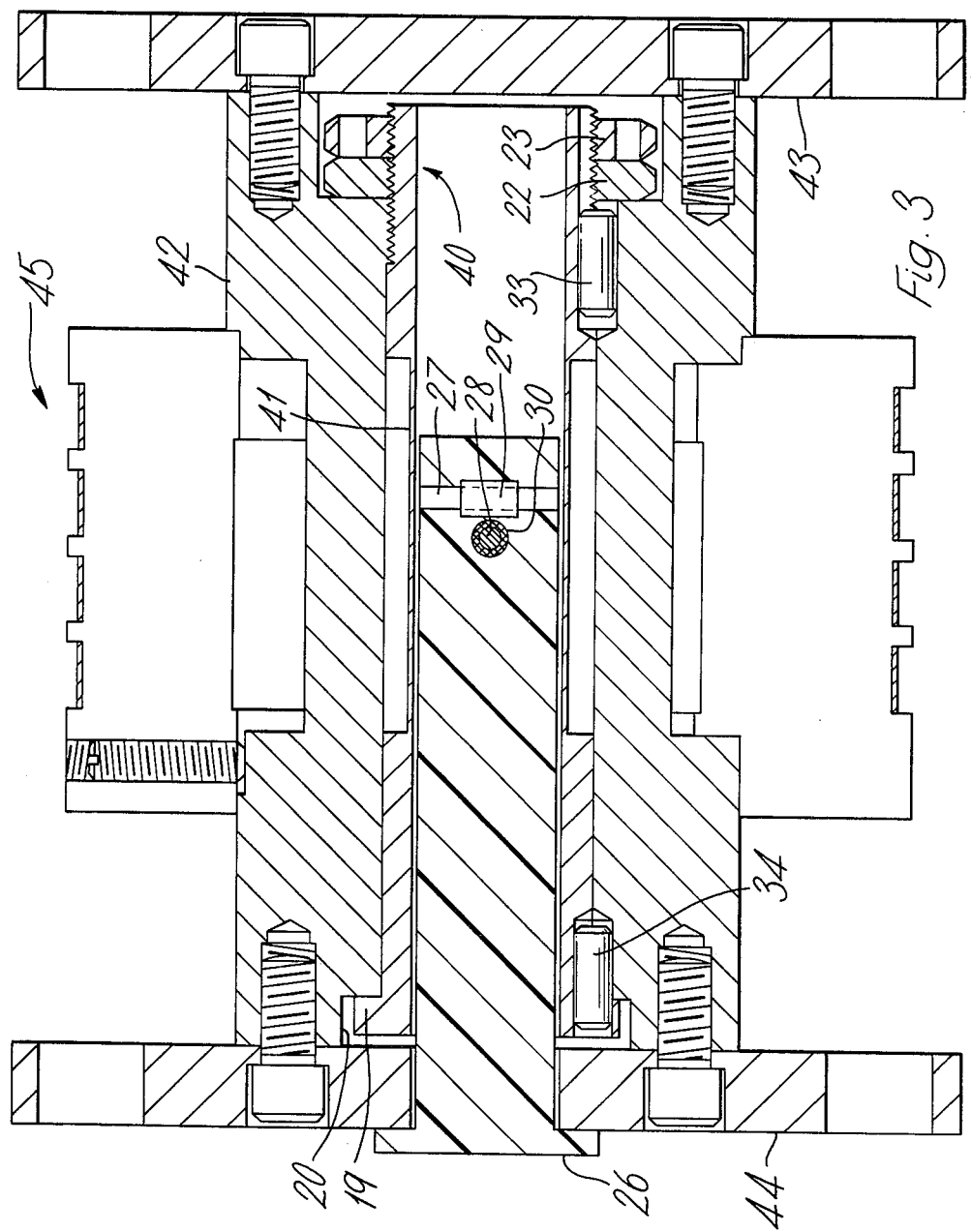

STRAIN MEASUREMENT

The present invention relates to apparatus for the measurement of strain and can particularly, but not exclusively, be applied to the measurement of torque. In the measurement of torque it is usual to provide a shaft coupling, for example, a motor, the torque of which is to be measured and a load driven by the motor through the shaft. Strain gauges are then mounted on the shaft and the strain produced in the shaft is proportional to the torque produced by the motor.

However, this prior arrangement suffers from the disadvantage that the strain gauge or gauges form part of a bridge network and connections have to be brought from the shaft through sliprings to measuring equipment. Since small changes in the resistance of strain gauges are to be measured the contacts made through the sliprings must be of very high quality and consequently the sliprings and the associated brushes are extremely costly.

In the measurement of pressure and density of gases it is known to use a thin walled cylinder which is electromagnetically vibrated at a natural frequency and to measure the frequency of vibration of the cylinder walls to give an indication of gas pressure or density.

According to the present invention there is provided apparatus for strain measurement, including a cylinder, exciting means for vibrating the wall of the cylinder, loading means for longitudinally straining the cylinder wall by an amount dependent on a strain to be measured, means for providing a signal representative of the frequency of vibrations of the cylinder wall, the cylinder wall being of a thickness such that an appreciable change in the said frequency occurs when longitudinal strains, dependent on strains within a range to be measured, are applied to the cylinder wall by the loading means.

The present invention is based on the realization by the inventors that the cylinder may be used in strain measurements, provided the strain to be measured is appropriately applied to the cylinder, since the frequency of vibration of the cylinder wall depends on the longitudinal strain applied to the cylinder.

Strain measurement may be made either by noting the change in vibration frequency of the cylinder wall which occurs when strain is applied, or by comparison with a calibration curve of strain versus frequency previously derived under known strain conditions.

In most circumstances it will be preferable for the cylinder to have relatively thin walls and be positioned within a cylinder having relatively thick walls, with the ends of the thin walled cylinder fixed against relative rotation and longitudinal movement relative to the thick walled cylinder. A torque may then be applied to the mid portion of the thin walled cylinder setting up a longitudinal strain therein since the thick walled cylinder prevents the thin walled cylinder contracting freely. Instead the thin walled cylinder may be pre-stressed longitudinally and a dynamic torque applied to the thick walled cylinder, when contraction of the thick walled cylinder reduces the longitudinal strain in the other cylinder. In both cases the vibration frequency of the walls of the thin walled cylinder provides an indication of applied torque.

Where static torque is to be measured, the thick walled cylinder may have an aperture through which a member fixed to the thin walled cylinder projects. The torque to be measured is then applied between the projecting member and the thick walled cylinder or alternatively longitudinal strain measurements may be made for a test member so fixed at one end to the thick walled cylinder and at the other to the projecting member that the projecting member rotates about the longitudinal axis of the thin walled cylinder when longitudinal strain is applied to the test member.

Advantageously the projecting member may be fixed to a relatively thick walled portion of the thin walled cylinder positioned half-way between two relatively thin walled portions.

Preferably the means fixing the thin walled cylinder to the thick walled cylinder at one end are adjustable to allow the thin walled cylinder to be tensioned as required. In this way the natural frequencies of the thin walled cylinder can be tuned to suit the frequency selective amplifier and the strain expected to be applied to the thin walled cylinder.

Where dynamic torque is to be measured the thick walled cylinder is placed between a prime mover and its load and most of the torque is carried by the thick walled cylinder. Sliprings may then be provided around the thick walled member to allow the power supply and output signals to reach and leave the coils and amplifier located within the thin walled cylinder.

Advantageously the thin walled cylinder has stell walls and the exciting means includes a coil surrounding a permanent magnet or rod of magnetic material. The coil is supplied, in operation, with alternating current so that a portion of the wall is alternately attracted and repulsed from the permanent magnet or rod.

The means for providing a signal representative of the frequency of vibrations may include a similar coil and permanent magnet or rod or may for example include a microphone capable of picking up sound signals from the cylinder walls.

Where two coils are used, one as the exciting means and one for providing the signal representative of cylinder vibrations, the axes of the coils should be at right angles to prevent pick-up between the coils and if the coils are in close proximity they may be mounted together using non-magnetic and non-conductive mounting members.

Preferably the output from the means for providing a signal representative of the frequency of vibrations is coupled to provide the alternating current for the exciting means. The frequency of the alternating current will then be the natural frequency at which the thin walled cylinder is at the time vibrating. Measurement of this frequency can be made by way of a parallel connection at the input of the exciting means to shaping means for squaring up the current waveform coupled either direct to a pulse counter or to means for measuring the intervals between corresponding points, say leading edges, in successive pulses.

Preferably the means for providing a signal representative of the frequency of vibrations includes a frequency selective amplifier for amplifying the said frequency-representative signal and the exciting means is coupled to the output of the amplifier so that in this way the walls of the thin walled cylinder are encouraged to vibrate in a particular frequency range. There are usually a large number of natural frequencies at which the cylinder may vibrate and by using the amplifier one of these frequencies is selected as it varies with strain.

Where dynamic torque is to be measured in the way mentioned above, the two coils and the amplifier may be positioned within the thin walled cylinder and the only connections which are then required are for the power supply to the amplifier and coils and for the output from the amplifier. This output will usually be at a relatively high level but in any case it is shaped after transmission through sliprings before application to measurement circuits. Thus relatively low grade sliprings and brushes may be used in place of the high quality items mentioned above when dynamic torque is measured.

Another advantage of the invention is that a direct digital output may be obtained. Where dynamic torque measurement is to be carried out, a more economical basic arrangement is provided than the prior arrangement where strain gauges and high quality sliprings are used, and in addition a digital output is provided without the use of an analogue to digital converter following measurement circuits.

The cylinder or cylinders used in the present invention need not be circular in cross section but the cross section should be a smooth curve. Apertures may be cut in the cylinder or cylinders provided the overall general cylindrical shape is preserved.

Figure 2:
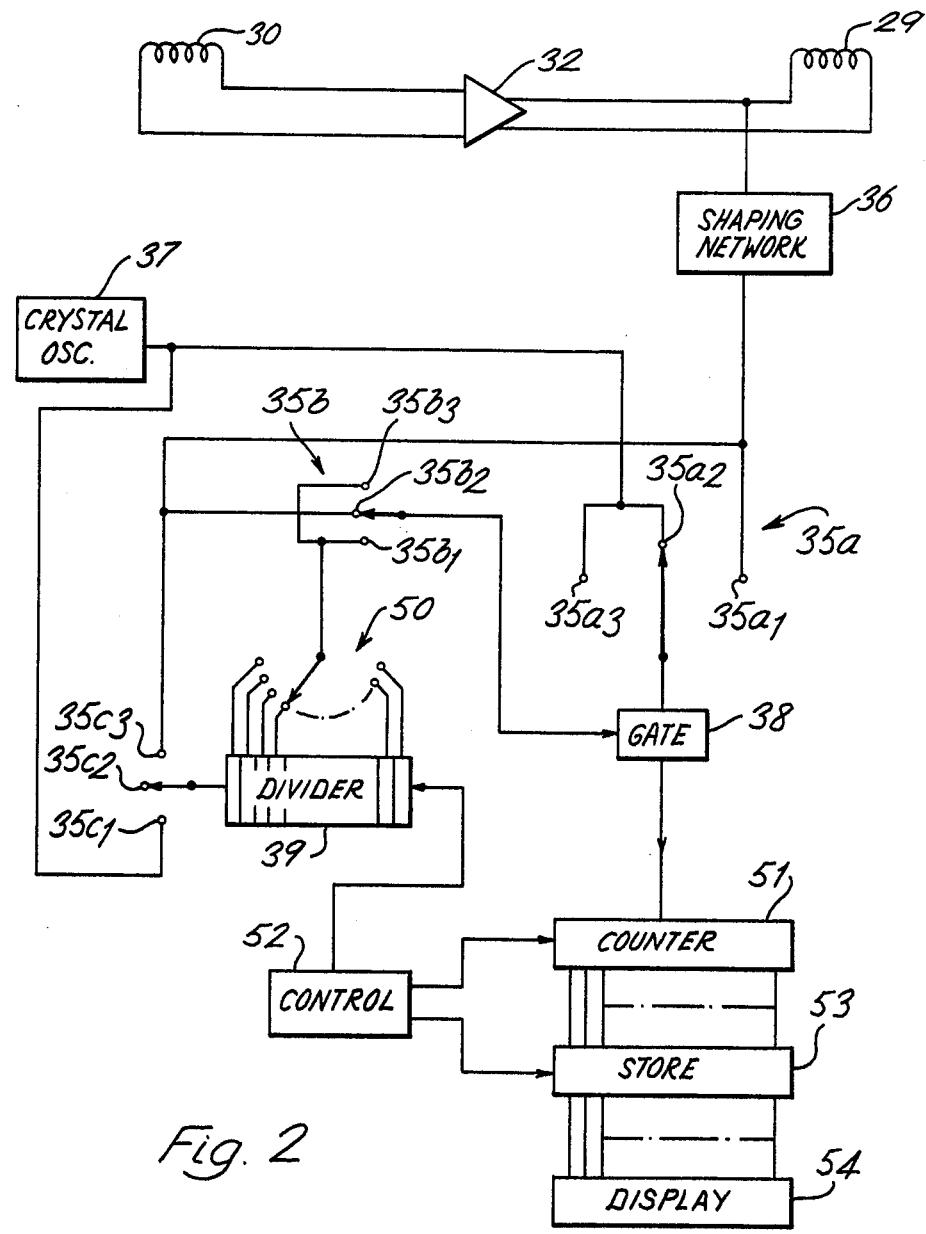

Certain embodiments of the invention will now be described by way of example with reference to the following drawings, in which:

FIG. 1 is a part cross section of a first embodiment of apparatus according to the invention, FIG. 2 is an electrical block diagram showing the circuits used in apparatus of FIG. 1, and FIG. 3 is a cross section of a further embodiment of the invention for measuring dynamic torque.

In FIG. 1 a thin walled steel cylinder 10 has thin wall sections 11 and 12 with wall thicknesses of approximately three thousandths of an inch. An arm 13 is attached to a thick walled central section of the cylinder 10 and at each end of the cylinder 10 there are two thick walled sections 15 and 16. The cylinder 10 is contained within a thick walled cylinder 17 having a slot 18 for the arm 13. In order to prevent the cylinder 10 from contracting when a load is applied to the arm 13 an abutment 19 of the cylinder 10 bears on the interior of an annular recess 20 in the cylinder 17; and at the other end of the cylinder 17 a nut 22 and a lock nut 23 are fixed to a threaded porion 24 of the cylinder 10, the nut 22 bearing on the top face 25 of the cylinder 17. By moving the nuts 22 and 23 the cylinder 10 may be pre-tensioned as required. An insulating slug 26 is positioned within the cylinder 10 and contains permanent magnets 27 and 28 surrounded by coils 29 and 30 respectively. The axes of the magnets 27 and 28 are orthogonal to one another.

In operation a load is applied to the arm 13 in a direction which will apply torsional stress to the cylinder 10 but since the cylinder cannot contract freely a longitudinal strain is also set up and the frequency of oscillation of the cylinder changes. The electrical circuit of FIG. 2 then provides a digital display or readout proportional to the strain in the cylinder 10. Thus for measuring longitudinal strain in, for example, an elongated specimen, the cylinder 17 is fixed relative to one end of the specimen and the arm 13 is fixed to the other end of the specimen in such a way that as the specimen extends or contracts the arm 13 revolves at right angles to the plane of FIG. 1. Similarly for static torque measurement one end of the specimen to be put under torsional stress is fixed relative to the cylinder 17 while the other end is fixed to the arm 13. The arrangement is such that as the specimen is strained the arm 13 revolves in the plane at right angles to the axis of the cylinder 10.

With the apparatus of FIG. 1 set out as described in the previous paragraph the circuit of FIG. 2 is switched on and any initial transient causes the coil 29 to vary the magnetic flux associated with the magnet 27 and so attract the thin walled portion 12 towards the magnet. In doing so the magnetic flux associated with the magnet 28 and the coil 30 varies changing the input to an amplifier 32 which again varies the flux associated with the coil 29 in the magnet 27. Thus the thin walled portion 12 of the cylinder 10, the magnets 27 and 28, the coils 29 and 30 and the amplifier 32 form a closed loop oscillatory system which vibrates the cylinder 10. With suitable dimensions and by tuning the natural frequency of the cylinder 10 by adjustment of the nuts 22 and 23, the oscillatory system can be made to oscillate at a natural frequency of the cylinder 10 which may for example be about 1000 Hz. The amplifier 32 is frequency selective so that oscillations at other natural frequencies of the cylinder 10 are substantially prevented. One advantage of the arrangement shown is that with an amplifier with approximately the correct frequency response it is possible to adjust the natural vibration frequencies of the cylinder 10 to fall within the region of peak response from the amplifier 32 by adjusting the nuts 22 and 23.

As the cylinder 10 is strained by rotation of the arm 13 the natural frequency of the cylinder is found to change by approximately ± 10% of the resonant frequency provided the cylinder is prevented from contracting in the longitudinal direction as it is in the arrangement of FIG. 1. If the cylinder is allowed to contract there is very little change in resonant frequency with applied torsion since stresses in the cylinder walls are relieved by the contraction.

Screwed slugs 33 and 34 prevent relative rotation between cylinders 10 and 17.

In FIG. 2 a function switch, having three portions 35a, 35b and 35c, has three positions (subscripts 1, 2 and 3): one to allow pulses derived from the oscillations of the cylinder 10 to be counted, a second to allow the duration of one period of the oscillation to be measured and a third to allow the average period of a number of such oscillations to be measured, respectively.

The signal at the output of the amplifier 32 which is at natural frequency of oscillation of the cylinder 10, reaches the portion 35a of the function switch by way of a shaping network 36 provided to ensure positive switching.

In the first position of the function switch a crystal oscillator 37 opens a gate 38 for an interval determined by a time selector formed by a frequency divider circuit 39 and a multi-position switch 50. Pulses passing through the gate are counted by a counter 51. When the gate 38 closes, a control circuit 52 transfers the count to a store 53 and thence to a display circuit 54, and resets the counter 51. Thus the display is representative of the frequency of oscillation of the cylinder wall 10 and hence strain.

In the second position, the function switch passes pulses from the crystal oscillator 37 to the gate 38 which is open for intervals determined by pulses from the shaping network. Now the display is representative of the period of the wall oscillation.

The resolution of the display can be selected by appropriate setting of the time selector switch 50. The longer the gate 38 is open, the greater the resolution, although the count displayed represents the average pulse rate over the time selected. In the second position the resolution of the periodic time measurement depends on the frequency of the oscillator 37 and if the periodic time is short relative to the clock rate, then the resolution is low.

An improvement is obtained in the third position where pulses from the oscillator 37 are counted but the counting continues for the duration of the number of wall oscillation periods selected using the switch 50.

For example if the frequency of the oscillator is 10 MHz and the wall oscillation is at 100 KHz then a resolution of 1 in 100 is the best that can be achieved in the second position. However, in the third position with the gate 38 open for 100 periods of the wall oscillation, a resolution of 1 in 10,000 is achieved.

The control circuit 52 may be under manual control where, for example, a display of the count is provided, or if the counter reads out to a computer instead of the display circuit 54, the computer provides a signal for the circuit 52 when it is ready to receive signals representative of strain.

An arrangement for measuring dynamic torque is shown in FIG. 3 and this arrangement has many similarities with the arrangement of FIG. 1. A cylinder 40 has a thin walled central section 41 containing an insulating slug 26 holding the magnets 27 and 28 with their coils 29 and 30. The cylinder 40 is contained within a thick walled cylinder 42 and is longitudinally pre-strained by the use of nuts 22 and 23 together with the abutment 19 and a recess 20. Flanges 43 and 44 are screwed to the cylinder 42 to allow the whole arrangement of FIG. 3 to be included in a drive shaft between a prime mover and its load. Sliprings, indicated generally at 45, are mounted on the outside of the cylinder 42 and provide connections for the amplifier 32 (not shown in FIG. 3) which is positioned within the cylinder 41 preferably in a recess in the slug 26 adjacent to the coils 29 and 30. Connections between the amplifier and the sliprings are not shown in FIG. 3.

In operation, most of the torsional strain is carried by the cylinder 42 and as it contracts under this strain the longitudinal pre-strain in the thin walled section 41 is partially relieved. Hence the natural frequency of the cylinder 40 changes and a count representative of strain and therefore torque is displayed or read out. Two of the sliprings 45 provide power connections for the amplifier 32 and the other two provide connections between the amplifier 32 and the control circuit 35.

The circuit of FIG. 2 may be used with the arrangement of FIG. 3.

Two ways of putting the invention into practice have been specifically described but it will be apparent that there are many other ways of doing so. For example the magnet system causing the cylinder to oscillate may be placed outside the cylinder and the coil 30 may be replaced by other pick-up devices such as a microphone. The circuit for measuring the frequency at the output of the amplifier 32 may be varied and it is not necessary to employ a closed loop arrangement, i.e., the circuit for vibrating the cylinder may be entirely separate from the circuit which measures the oscillation frequency of the cylinder. The two embodiments described employ torsionally applied longitudinal strain in the thin walled cylinder but in other applications a longitudinal strain may be applied directly to the cylinder and measurement of frequency of oscillation is then proportional to the longitudinal strain.

We claim:
1. Apparatus for strain measurement, comprising:
   a first cylinder having a relatively thin wall at least over a major portion of its length;
   a second cylinder having a relatively thick wall;
   one of said first and second cylinders being at least partially disposed within the other, with said first cylinder being fixed against relative rotation and longitudinal movement relative to said second cylinder at two positions which are spaced apart longitudinally with respect to the cylinders, but not so fixed between the said positions;
   exciting means for vibrating the wall of said first cylinder;
   loading means for longitudinally straining the wall of said first cylinder by an amount dependent upon a strain to be measured; and
   means for providing a signal representative of the frequency of vibrations of the wall of said first cylinder, said first cylinder wall being of a thickness such that an appreciable change in said frequency occurs when longitudinal strains, dependent on strains within a range to be measured, are applied to said first cylinder wall by said loading means.

2. Apparatus according to claim 1, wherein said first cylinder is at least partially disposed inside said second cylinder.

3. Apparatus according to claim 2 wherein said second cylinder has an aperture in its wall between and remote from the said positions, and the apparatus includes an elongated member fixed to said first cylinder and projecting through the aperture, the aperture having a circumferential dimension sufficient to allow the elongated member to rotate about the longitudinal axis of said first cylinder over at least a few degrees.

4. Apparatus according to claim 3 wherein the elongated member is fixed to a relatively thick portion of the wall of said first cylinder between two relatively thin walled portions, the thick portion extending completely round said first cylinder.

5. Apparatus according to claim 1 including means for applying an adjustable tension to said first cylinder by tensioning said first cylinder against said second cylinder.

6. Apparatus according to claim 2 wherein the wall of said first cylinder is of a metal which is attracted by a magnetic field, the exciting means includes a coil magnetically coupled to a member comprising a permanent magnet or magnetic material, and the apparatus includes means for passing an alternating current through the coil.

7. Apparatus according to claim 6 wherein the means for providing a signal representative of the frequency of vibrations includes a further coil magnetically coupled to a further member comprising a permanent magnet of magnetic material.

8. Apparatus according to claim 7 wherein the axes of the two coils are mutually at right angles, the two coils are within said first cylinder, and the means for passing alternating current include the further coil.

9. Apparatus according to claim 8 including a frequency selective amplifier with input connected to the further coil and output connected to the other coil.

10. Apparatus according to claim 9 wherein the amplifier is within said first cylinder, and said second cylinder is provided with slip rings for connections to the coils and the amplifier.

11. Apparatus according to claim 9 including shaping means for squaring the waveform of current from the amplifier, and a counter for counting the pulses so formed.

12. Apparatus according to claim 11 including gating means, means for coupling the gating means between the amplifier and the counter, and means for enabling the gating means for an interval of selectable duration.

13. Apparatus according to claim 9 including a source of pulses, a counter, gating means, means for coupling the gating means between the counter and the pulse source, and means for enabling the gating means for an interval dependent on the period of the output signal of the amplifier.

14. Apparatus for strain measurement, comprising:

a cylinder;

exciting means for vibrating the wall of said cylinder;

loading means for longitudinally straining said cylinder wall by applying torsion to the cylinder, the applied torsion being dependent on a strain to be measured;

means for so constraining said cylinder that its length cannot change freely; and means for providing a signal representative of the frequency of vibrations of said cylinder wall, the cylinder wall being of a thickness such that an appreciable change in said frequency occurs when longitudinal strains, dependent on strains within a range to be measured, are applied to said cylinder wall by said loading means.

* * * * *